May 16, 1944.    W. R. FREEMAN    2,348,734
SLACK ADJUSTER
Filed Dec. 14, 1942    2 Sheets-Sheet 1
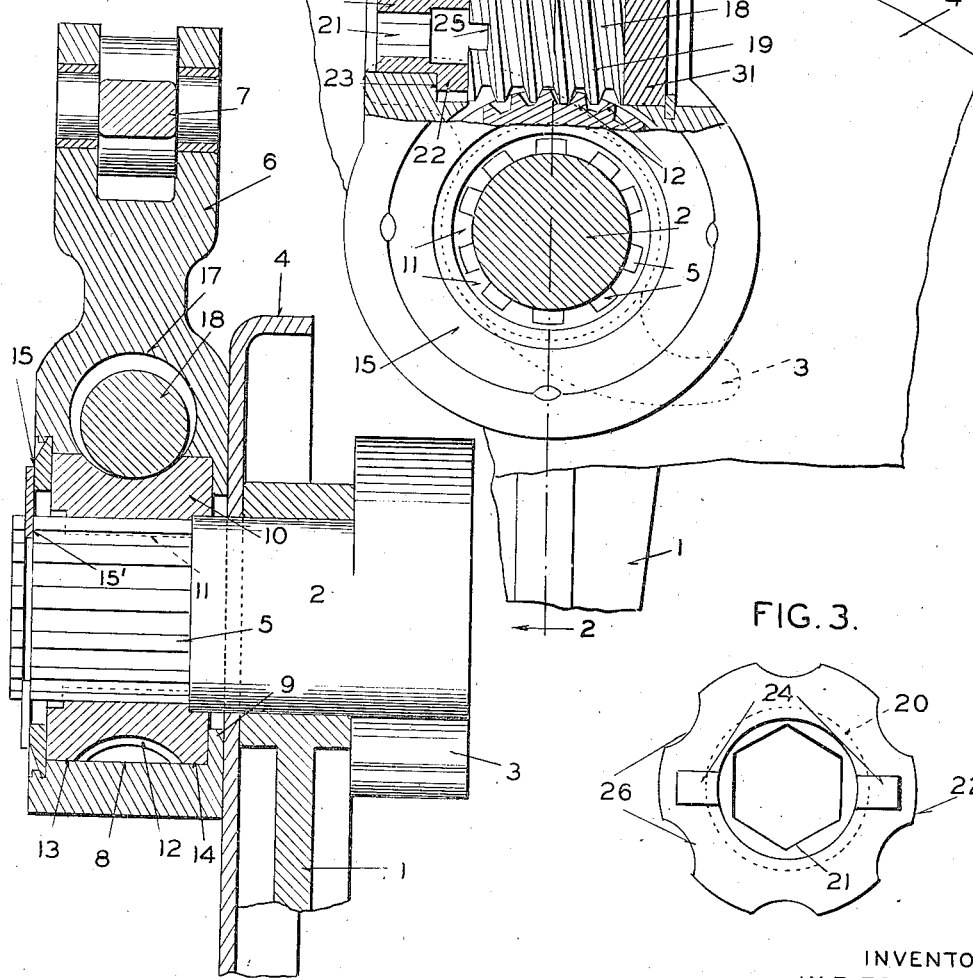
INVENTOR
W.R.FREEMAN
BY
ATTORNEY May 16, 1944.　　　W. R. FREEMAN　　　2,348,734
SLACK ADJUSTER
Filed Dec. 14, 1942　　　2 Sheets-Sheet 2

INVENTOR
W. R. FREEMAN
BY
ATTORNEY

Patented May 16, 1944

2,348,734

UNITED STATES PATENT OFFICE 2,348,734

SLACK ADJUSTER

Walter R. Freeman, Clayton, Mo., assignor to Wagner Electric Corporation, St. Louis, Mo., a corporation of Delaware Application December 14, 1942, Serial No. 468,890

5 Claims. (Cl. 74—522)

My invention relates to slack adjusters and more particularly to one for brake actuating mechanism whereby the slack in said mechanism resulting from brake shoe wear may be taken up.

One of the objects of my invention is to produce an improved slack adjuster of the worm and worm wheel type which will be economical to manufacture and easy to adjust when installed.

Another object of my invention is to so construct a slack adjuster of the type referred to that the worm and worm wheel can be journaled directly on their teeth and adjusted by means independent of the worm mounting.

Still another object of my invention is to produce an improved unitary structure comprising a totally enclosed combined slack adjuster and fluid pressure actuating means which can be easily adjusted from the exterior.

Figure 4:
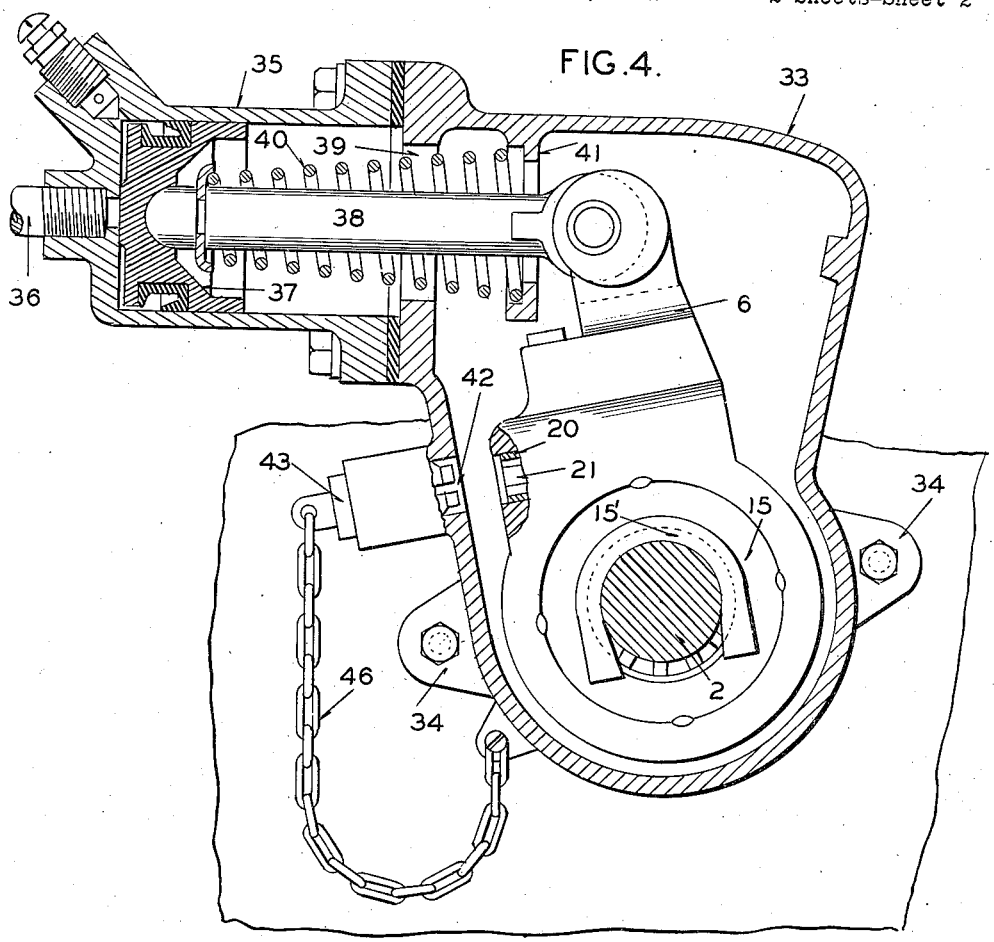
Figure 5:
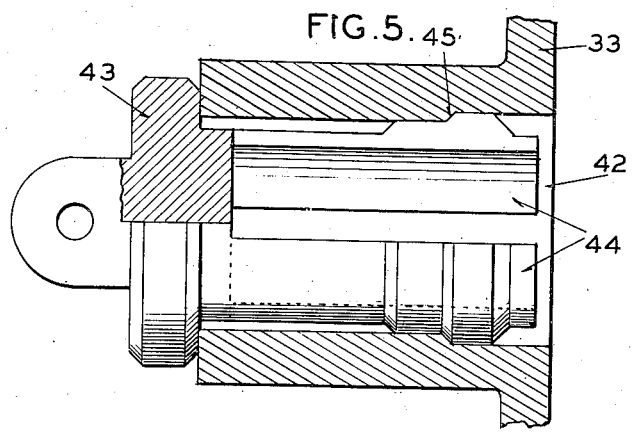

Other objects of my invention will become apparent from the following description taken in connection with the accompanying drawings in which Figure 1 is a view, partly in section, of a slack adjuster embodying my invention; Figure 2 is a sectional view taken on the line 2—2 of Figure 1; Figure 3 is an end view of the adjusting shaft; Figure 4 is a sectional view showing a unitary construction comprising a fluid motor combined with the slack adjuster and totally enclosed; and Figure 5 is an enlarged view of the closure plug for the wrench receiving opening in the enclosing casing of the unit.

Referring to the drawings in detail and first to Figures 1, 2, and 3, numeral 1 indicates a portion of the supporting spider for a brake in which is journaled a cam shaft 2 provided with an S-type cam 3 on its inner end for actuating the ends of the brake friction device (shoes) in a well-known manner. The outer end of the cam shaft projects beyond the closure or dust plate 4 of the brake which encloses the usual drum and said outer end is provided with splines 5. This cam shaft is adapted to be actuated by a lever or arm 6 mounted on the splined end of the cam shaft. A rod 7 is connected to the arm to actuate the brake from a remote point.

As the brake friction device wears, it will be necessary to move the arm a greater distance to take up slack and apply the brakes. In order to eliminate this slack it is desirable that a slack take-up means be provided which can be adjusted as wear takes place. This is conveniently embodied between the end of the splined shaft and the arm.

In accordance with my invention the hub portion of arm 6 is provided with a bore 8 partially closed at one end by an annular flange 9 integral with the arm. Within this bore is mounted and supported a worm wheel 10 provided with internal splines 11 for cooperation with the splines on the cam shaft. Teeth 12 of the worm wheel are cut from the central circumferential surface of the wheel blank in order to leave cylindrical surfaces 13 and 14 on opposite sides for bearing engagement with the internal cylindrical surface of bore 8. By means of this arrangement it is seen that the arm will be rotatably supported on the shaft by means of the worm wheel. The worm is held in the bore by means of a washer 15 shown as being "staked" to the arm.

The hub portion of the arm is also provided with axially aligned inter-communicating bores 16 and 17, the latter being of somewhat larger diameter and of considerably greater length than the former. The large bore is arranged to intersect bore 8 in which the worm wheel 10 is supported and mounted in said larger bore is a worm 18, the thread 19 of which is cut so that it has an outer peripheral bearing surface of such diameter as to fit within the bore. This provides a mounting for the worm without the necessity of any special mounting shaft projections on the worm.

In the small bore 16 there is journaled an adjusting shaft 20 having an octagon bore 21 therein whereby a suitable octagon-shaped wrench can be inserted for turning the shaft. The inner end of shaft 20 extends into the large bore and is provided with an annular flange 22 interposed between the inner end of the worm and shoulder 23 at the inner end of said large bore. The end of the shaft at the flange carries two projections 24 which are adapted to fit within a cross-slot 25 cut in the end of the worm. The projections and slot are arranged to have a "sloppy" fit so that in the event the axis of the shaft does not coincide perfectly with the axis of the worm, the shaft will not cause binding of the worm and hamper the turning thereof. The peripheral portion of the shaft flange 22 is provided with circumferentially spaced recesses 26 and cooperating therewith is a ball 27 backed by a spring 28, said spring and ball being positioned in a bore 29 in the arm which is closed by a threaded plug 30 forming a backing for the spring. The worm 18 is held in its bore 17 with the projections 24 and slot 25 engaged by means of a plug 31 and a snap ring 32 at the outer end of bore 17. A locking washer 15' holds the arm and parts carried thereby on shaft 2.

When it is desired to take up any slack between the arm and the cam shaft, such may be done by merely turning the adjusting shaft 20 with a suitable wrench. This will rotate the worm and through it the worm wheel and cam shaft, thus changing the relationship between the cam shaft and the arm. The adjusted position will be maintained by the spring-biased ball 27.

It is to be noted from the construction just described that all special shaft mountings for the worm are eliminated as the worm is journaled directly in bore 17 on its own threads. Since no mounting shaft is necessary, the worm may be cut from a long piece of worm stock, thus decreasing the cost of manufacture. The structure is also such that the adjusting shaft of the worm and the detent for holding said adjusting shaft is separate from the worm and has only a connection therewith by means of a projection fitting into a slot. Because this projection and slot have a "sloppy" fit, any mis-alignment in the mounting of the worm and shaft will not produce a binding action. Close dimensioning in manufacture is not necessary, thereby further reducing the cost of manufacture. The parts may be very quickly assembled since the adjusting shaft is held in position by the worm and the only special holding means for maintaining the worm and adjusting shaft in their operating positions is a plug and snap ring.

The slack adjuster just described is also very well adapted for use with a fluid motor where such is desired to be employed to produce the actuating force on the outer end of the arm. In Figures 4 and 5 there is shown a preferred manner in which the slack adjuster and the operating fluid motor can be conveniently associated with each other and totally enclosed in order to be a unitary assembly permitting easy mounting. Referring to these figures in detail, the arm and adjusting mechanism, including the worm and worm wheel, are the same as those described in Figures 1, 2, and 3 and so indicated by the same reference characters. Enclosing the arm and the outer end of the cam shaft is a casing 33 of such size as to permit sufficient movement of the arm to actuate the brake operating cam. This casing may be connected to any suitable support as, for example, the backing plate of the brake or the axle housing, bolt receiving flanges 34 being shown on the housing for mounting purposes. On the outer portion of the casing adjacent the free end of the arm there is mounted a cylinder 35 with which communicates a conduit 36 coming from a suitable source of pressure as, for example, a master cylinder device for a hydraulic brake actuating system. Within the cylinder is a piston 37 which is connected to operate the arm by means of a rod 38 extending through the cylinder and an aligned opening 39 in the casing. A spring 40 surrounds the rod 38 and is interposed between a washer on the rod and a projection 41 on the inside of the casing. This spring acts to maintain the piston and the arm in their normally inoperative positions.

Since it is desired that the slack adjuster be totally enclosed to exclude dust and other foreign matter, provision is made to adjust the slack adjuster from the exterior of the casing. In order to accomplish this, the casing is provided with an opening 42 which is aligned with the axis of the wrench receiving bore of the adjusting shaft 20 for the worm but only when the arm is in its inoperative position as determined by spring 40. It is seen that by this arrangement the slack adjuster can be operated to take up slack whenever the fluid motor is not being operated to actuate the cam shaft. This is accomplished by inserting the octagon end of a suitable wrench or tool through opening 42 and into the octagon bore of the adjusting shaft. The opening 42 is closed by a plug 43 which is made to be readily removable. As shown, this plug comprises spring fingers 44 which extend into opening 42 for cooperation with an annular shoulder 45 at the inner end of the opening. In order that plug 43 will not be lost when removed, a chain 46 connects the plug with the casing 33. To remove the plug all that need be done is to pull the chain.

In the construction just described it is seen that the fluid motor and slack adjuster are combined as a unit. This facilitates mounting as all that needs to be done is to slide the worm wheel on the splined end of the cam shaft 2 and then secure the casing 33 to the support. All dust, water, ice, and so forth is kept from contacting any moving parts of the unit yet whenever an adjustment of the slack adjuster is desired, it can be conveniently made by merely pulling the plug, inserting a tool through the opening into the bore of shaft 20, and turning it.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a slack adjusting mechanism for association with an actuating shaft and comprising an actuating arm, a worm wheel rotatably supported in the arm and adapted to be secured to the actuating shaft, a solid worm mounted in the arm and cooperating with the worm wheel, a separate adjusting shaft journaled in the arm axially with the worm and positioned longitudinally with respect to the body of the worm, said shaft being provided with an irregular wrench receiving bore open to the exterior, detent means carried by the adjusting shaft and arm for holding the shaft in adjusted positions, inter-engaging means carried by the adjacent ends of the adjusting shaft and worm, and means for holding the worm and adjusting shaft from relative longitudinal movement.

2. In a slack adjusting mechanism for association with an actuating shaft and comprising an actuating arm, a worm wheel rotatably supported in the arm and adapted to be secured to the actuating shaft, a solid worm mounted in the arm and cooperating with the worm wheel, an adjusting shaft journaled in the arm axially with the worm and longitudinally with respect to the body of the worm and having a radial flange portion positioned adjacent one end of the worm, said flange being provided with circumferentially spaced recesses, spring-biased detent means carried by the arm for cooperation with the recesses, inter-engaging means carried by the adjusting shaft and the worm, and means for holding the worm and adjusting shaft in positions whereby the inter-engaging means are cooperatively engaged.

3. In a slack adjusting mechanism for association with an actuating shaft and comprising an actuating arm, a worm wheel rotatably supported in the arm and adapted to be secured to the actuating shaft, a two-diameter bore through the arm, a solid worm mounted in the larger portion of the bore for cooperating with the worm wheel and being journaled by its threads on the surface of the bore, a separate adjusting shaft mounted longitudinally of the body of the worm in the smaller portion of the bore and having a flange portion positioned in the larger portion of the bore between the end thereof and the adjacent end of the worm, means cooperating with the other end of the worm for holding the worm in the bore, inter-engaging means between the adjusting shaft and the worm, and detent means for holding the adjusting shaft and worm in different adjustable positions.

4. In a slack adjusting mechanism for association with an actuating shaft and comprising an actuating arm, a worm wheel rotatably supported in the arm and adapted to be secured to the actuating shaft, a two-diameter bore through the arm, a solid worm mounted in the larger portion of the bore for cooperating with the worm wheel and being journaled by its threads on the surface of the bore, a separate adjusting shaft mounted longitudinally of the body of the worm in the smaller portion of the bore and having a flange portion positioned in the larger portion of the bore between the end thereof and the adjacent end of the worm, means cooperating with the other end of the worm for holding the worm in the bore, inter-engaging means between the adjusting shaft and the worm, and detent means for holding the adjusting shaft and worm in different adjustable positions, said detent means comprising circumferentially spaced recesses in the flange portion of the actuating shaft and a spring-biased member carried by the arm for cooperation with the recesses.

5. In a slack adjusting mechanism for association with an actuating shaft and comprising an actuating arm, a worm wheel rotatably supported in the arm and adapted to be secured to the actuating shaft, a two-diameter bore through the arm, a solid worm mounted in the larger portion of the bore and cooperating with the worm wheel, said worm being provided with a recess on its end adjacent the inner end of the bore, a separate adjusting shaft mounted longitudinally of the body of the worm in the smaller portion of the bore and having a flange portion positioned in the larger portion of the bore between the end thereof and the adjacent recessed end of the worm, said shaft also being provided with a wrench receiving bore and a projection on its inner end for reception in the recess in the end of the worm, means cooperating with the other end of the worm for holding the worm in the bore and the projection in the recess, and detent means cooperating with the adjusting shaft for holding said shaft and worm in different adjustable positions.

WALTER R. FREEMAN.